United States Patent
Banat et al.

(10) Patent No.: US 12,287,055 B2
(45) Date of Patent: Apr. 29, 2025

(54) RAISED TEMPERATURE RESISTANT PIPES COMPRISING AN ETHYLENE-BASED POLYMER

(71) Applicant: SABIC GLOBAL TECHNOLOGIES B.V., Bergen op Zoom (NL)

(72) Inventors: Yahya Banat, Geleen (NL); Nasser Abdullah Al-Saif, Geleen (NL); Abdelhamid Mokdad, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 814 days.

(21) Appl. No.: 17/312,481

(22) PCT Filed: Dec. 20, 2019

(86) PCT No.: PCT/EP2019/086540
§ 371 (c)(1),
(2) Date: Jun. 10, 2021

(87) PCT Pub. No.: WO2020/127879
PCT Pub. Date: Jun. 25, 2020

(65) Prior Publication Data
US 2022/0049797 A1   Feb. 17, 2022

(30) Foreign Application Priority Data
Dec. 20, 2018  (EP) .................................. 18214534

(51) Int. Cl.
*F16L 9/12*        (2006.01)
*C08F 4/6592*      (2006.01)
*C08L 23/08*       (2006.01)

(52) U.S. Cl.
CPC ............ *F16L 9/12* (2013.01); *C08F 4/65927* (2013.01); *C08L 23/08* (2013.01); *C08L 2203/18* (2013.01)

(58) Field of Classification Search
CPC .. C08F 210/14; C08F 210/16; C08F 2500/03; C08F 2500/055; C08F 2500/06; C08F 2500/10; C08F 2500/13; C08F 2500/27; C08L 23/0815; C08L 2203/18
USPC .............................. 428/34.1–36.92
See application file for complete search history.

(56) References Cited

U.S. PATENT DOCUMENTS

| 5,631,069 | A | * | 5/1997 | Wooster | ...................... | C08J 5/18 |
| | | | | | | 526/348.3 |
| 6,867,278 | B2 | * | 3/2005 | McDaniel | ............... | C08F 10/00 |
| | | | | | | 428/36.9 |
| 2004/0103948 | A1 | * | 6/2004 | Scheelen | .................. | B32B 1/08 |
| | | | | | | 138/145 |
| 2005/0245689 | A1 | * | 11/2005 | Krishnaswamy | ... | C08L 23/0815 |
| | | | | | | 525/240 |
| 2006/0036041 | A1 | * | 2/2006 | Kwalk | ..................... | C08L 23/04 |
| | | | | | | 525/240 |
| 2006/0275571 | A1 | * | 12/2006 | Mure | ...................... | C08L 23/04 |
| | | | | | | 428/36.9 |
| 2007/0043182 | A1 | * | 2/2007 | Martin | .................. | C08F 210/16 |
| | | | | | | 526/170 |
| 2011/0118417 | A1 | * | 5/2011 | Liu | ......................... | C08F 10/00 |
| | | | | | | 525/240 |
| 2012/0141710 | A1 | * | 6/2012 | Yang | ..................... | C08F 210/16 |
| | | | | | | 526/348 |
| 2013/0197136 | A1 | * | 8/2013 | Hagstrand | ............... | F16L 9/127 |
| | | | | | | 524/110 |

(Continued)

FOREIGN PATENT DOCUMENTS

| CN | 106674400 | A | * | 5/2017 | ................ | C08F 2/34 |
| EP | 0436520 | A1 | * | 7/1991 | ............ | C08F 210/16 |

(Continued)

OTHER PUBLICATIONS

International Search Report for International Application PCT/EP2019086540, International Filing Date Dec. 20, 2019, Date of Mailing Mar. 27, 2020, 6 pages.

(Continued)

*Primary Examiner* — Michael C Romanowski
(74) *Attorney, Agent, or Firm* — CANTOR COLBURN LLP

(57) ABSTRACT

The present invention relates to a pipe comprising an ethylene-based polymer, wherein the ethylene-based polymer: • comprises ≥0.10 mol % of units derived from 1-hexene, with regard to the total molar quantity of polymeric units of the ethylene-based polymer; • has an $M_w/M_n$ as determined in accordance with ASTM D6474 (2012) of ≥2.5 and ≤4.0, preferably of ≥2.5 and ≤3.4; • has a density as determined in accordance with ASTM D792 (2008) of ≥925 and ≤945 kg/m³; and • in the molecular weight range of $\log(M_w)$ between 4.0 and 5.5, has a comonomer branch content of between 2 and 15 comonomer-derived branches per 1000 carbon atoms in the polymer, as determined via $^{13}C$ NMR. Such pipe provides a desirably high long-term strength, as demonstrated by its high strain hardening modulus, as well as desirably high impact strength, as demonstrated by its high Charpy impact strength. Further, such pipe may be compliant with the PE-RT requirements of ISO 22391-1 (2009). For example, such pipe may be used for containing water at temperatures in the range of 40° C. to 80°.

12 Claims, No Drawings

(56) References Cited

U.S. PATENT DOCUMENTS

| | | | | |
|---|---|---|---|---|
| 2014/0024789 | A1* | 1/2014 | Ker | C08F 210/16 |
| | | | | 526/113 |
| 2014/0069547 | A1* | 3/2014 | Noopila | F16L 58/1027 |
| | | | | 427/444 |
| 2014/0213747 | A1* | 7/2014 | Hlavinka | C08F 10/14 |
| | | | | 526/348 |
| 2015/0011702 | A1* | 1/2015 | van den Esschert | C08F 10/00 |
| | | | | 524/585 |
| 2015/0031824 | A1* | 1/2015 | van den Esschert | C08F 10/00 |
| | | | | 502/155 |
| 2015/0210786 | A1* | 7/2015 | Hlavinka | F16L 9/127 |
| | | | | 526/147 |
| 2016/0115264 | A1* | 4/2016 | Rohatgi | C08L 23/0815 |
| | | | | 428/36.9 |
| 2016/0280822 | A1* | 9/2016 | Kim | C08F 4/64 |
| 2018/0112070 | A1* | 4/2018 | Hiramoto | C08L 23/08 |
| 2019/0135958 | A1* | 5/2019 | Kazemi | C08F 210/16 |
| 2019/0135960 | A1* | 5/2019 | Kazemi | C08F 210/16 |
| 2019/0161602 | A1* | 5/2019 | Chang | C08L 23/06 |
| 2020/0339715 | A1* | 10/2020 | Winesett | F16L 9/12 |
| 2021/0002463 | A1* | 1/2021 | Jeon | C08F 2/38 |
| 2021/0032449 | A1* | 2/2021 | Park | C08F 4/659 |

FOREIGN PATENT DOCUMENTS

| | | |
|---|---|---|
| EP | 2610269 A1 | 7/2013 |
| WO | 2016188999 A1 | 12/2016 |

OTHER PUBLICATIONS

Written Opinion for International Application PCT/EP2019086540, International Filing Date Dec. 20, 2019, Date of Mailing Mar. 27, 2020, 9 pages.

* cited by examiner

RAISED TEMPERATURE RESISTANT PIPES COMPRISING AN ETHYLENE-BASED POLYMER

CROSS REFERENCE TO RELATED APPLICATIONS

This application is a National Stage application of PCT/EP2019/086540, filed Dec. 20, 2019, which claims the benefit of European Application No. 18214534.2, filed Dec. 20, 2018, both of which are incorporated by reference in their entirety herein.

The present invention relates to a raised-temperature resistant pipe comprising an ethylene-based polymer. The invention further relates to a process for manufacturing of such pipe.

Ethylene-based polymers are presently widely used in water pipe applications, particularly for domestic use, for both hot and cold water supply. Such water pipe applications include domestic potable water supply systems as well as pipes for heating and cooling systems, such as underfloor heating systems or solar heat collection systems, where water is used as heating/cooling medium. The use of ethylene-based polymers in such pipes is beneficial as such materials are very inert, having desirable chemical resistance and corrosion resistance. Further, ethylene-based polymers have good weldability, allowing connection of pipes to each other via heat fusion welding.

As typically water supply systems are intended for a service life extending to over 50 years or more, materials that are to be used in the manufacture of such systems are to be compliant with stringent quality requirements. The requirements are set out by ISO under standard ISO 22391-1 (2009). An ethylene-based polymer that is compliant with these ISO requirements may be referred to as a PE-RT, or PolyEthylene of Raised Temperature resistance.

However, in order for ethylene-based polymers to qualify for the use in such water pipe applications, in particular to pass the requirements for long-term strength at elevated temperatures, the materials as used in the art typically need to undergo a cross-linking step. Such cross-linking be induced physically, for example by e-beam treatment, after moulding of the pipe, or chemically, by admixing certain agents that induce cross-linking during the melt extrusion moulding process that is employed to shape the pipe.

This induces a technical complication to the pipe manufacturing process, in that such cross-linking process needs to be applied, which is detrimental for the overall process economics. Further, such cross-linking is undesirable as the presence of cross-links in polyethylene materials negatively affect the processability during further melt processing, which may for example occur when such material is to be subjected to a melt processing step like melt extrusion as part of a recycling process. Given the emerging importance of recyclability of materials, there is a driver to ensure materials qualify for adequate processing in recycling methods.

In view of the above, there is a need to have access to materials that quality for use in water pipe systems for both hot and cold water use, having desirably long service life qualification, wherein no cross-linking is to be applied to the material. This has now been achieved according to the present invention by a pipe comprising an ethylene-based polymer, wherein the ethylene-based polymer:

comprises 0.10 mol % of units derived from 1-hexene, with regard to the total molar quantity of polymeric units of the ethylene-based polymer;

has an $M_w/M_n$ as determined in accordance with ASTM D6474 (2012) of ≥2.5 and ≤4.0, preferably of ≥2.5 and ≤3.4;

has a density as determined in accordance with ASTM D792 (2008) of ≥925 and ≤945 kg/m$^3$; and in the molecular weight range of log($M_w$) between 4.0 and 5.5, has a comonomer branch content of between 2 and 15 comonomer-derived branches per 1000 carbon atoms in the polymer, as determined via $^{13}$C NMR.

Such pipe provides a desirably high long-term strength, as demonstrated by its high strain hardening modulus, as well as desirably high impact strength, as demonstrated by its high Charpy impact strength. Further, such pipe may be compliant with the PE-RT requirements of ISO 22391-1 (2009). For example, such pipe may be used for containing water at temperatures in the range of 40° C. to 80°.

In the context of the present invention, it is to be understood that the ethylene-based polymer forms the wall of the pipe, or at least a layer of that wall.

For example, the ethylene-based polymer may comprise ≥0.20, or ≥0.30, or ≥0.40, or ≥0.50, or ≥0.60, or ≥0.70, or ≥0.80, or ≥0.90, or ≥1.00 mol % of units derived from 1-hexene, with regard to the total molar quantity of polymeric units of the ethylene-based polymer. For example, the ethylene-based polymer may comprise ≤5.00, or ≤4.50, or ≤4.00, or ≤3.50, or ≤3.00, or ≤2.50, or ≤2.00 mol % of units derived from 1-hexene, with regard to the total molar quantity of polymeric units of the ethylene-based polymer. For example, the ethylene-based polymer may comprise ≥0.10 and ≤5.00 mol %, or ≥0.20 and ≤4.50 mol %, or ≥0.30 and ≤4.00 mol %, or ≥0.40 and ≤4.00 mol %, or ≥0.50 and ≤3.50 mol %, or ≥0.60 and ≤3.50 mol %, or ≥0.70 and ≤3.00 mol %, or ≥0.80 and ≤3.00 mol %, or ≥0.90 and ≤2.50 mol %, or ≥1.00 and ≤2.50 mol %, or ≥1.00 and ≤2.00 mol % of units derived from 1-hexene, with regard to the total molar quantity of polymeric units of the ethylene-based polymer.

For example, the ethylene-based polymer may comprise ≥95.0 mol %, or ≥97.0 mol %, or ≥98.0 mol %, or ≥99.0 mol %, of units derived from ethylene, with regard to the total molar quantity of polymeric units of the ethylene-based polymer.

The ethylene-based polymer may for example have a molecular weight distribution $M_w/M_n$ of ≥2.5 and ≤3.8, preferably ≥2.8 and ≤3.8, more preferably ≥2.8 and ≤3.5, even more preferably ≥3.0 and ≤3.5. Alternatively, the ethylene-based polymer may have a molecular weight distribution $M_w/M_n$ of ≥2.5 and ≤3.4, preferably ≥3.0 and ≤3.4.

The ethylene-based polymer may for example have an $M_w$ of ≥100000 and ≤500000 g/mol, preferably ≥100000 and ≤300000 g/mol, more preferably ≥100000 and ≤200000 g/mol.

The ethylene-based polymer may for example have an $M_n$ of ≥25000 and ≤100000 g/mol, preferably ≥25000 and ≤50000 g/mol, more preferably ≥30000 and ≤50000 g/mol.

The ethylene-based polymer may for example have an $M_z$ of ≥100000 and ≤500000 g/mol, preferably ≥200000 and ≤400000 g/mol, more preferably ≥250000 and ≤400000 g/mol, wherein $M_z$ is determined in accordance with ASTM D6474 (2012).

The ethylene-based polymer may for example have a density of ≥925 and ≤940 kg/m$^3$, preferably of ≥930 and ≤940 kg/m$^3$, more preferably of ≥930 and ≤935 kg/m$^3$.

In the molecular weight range of log($M_w$) between 4.0 and 5.5, is it preferred that the ethylene-based polymer has a comonomer branch content of between 3 and 15 comonomer-derived branches per 1000 carbon atoms in the polymer, as determined via $^{13}C$ NMR, preferably between 3 and 12, more preferably between 3 and 9.

For example, the ethylene-based polymer may have a comonomer incorporation ratio of 1.50, preferably of ≥1.50 and ≤2.50, wherein the comonomer incorporation ratio is defined as the ratio between the quantity of comonomer-derived branches per 1000 carbon atoms in the polymer at $\log(M_w)=5.5$ and the quantity of comonomer-derived branches per 1000 carbon atoms in the polymer at $\log(M_w)=4.0$, as determined via $^{13}C$ NMR. More preferably, the ethylene-based polymer has a comonomer incorporation ratio of ≥1.50 and ≤2.00.

The ethylene-based polymer may for example have a melt mass-flow rate as determined in accordance with ASTM D1238 (2013) at a temperature of 190° C. under a load of 2.16 kg, (MFR2) of ≥0.1 and ≤5.0 g/10 min or ≥0.1 and ≤3.0 g/10 min or ≥0.1 and ≤2.0 g/10 min, or ≥0.1 and ≤1.5 g/10 min, or ≥0.3 and ≤1.5 g/10 min, or ≥0.3 and ≤1.2 g/10 min, or ≥0.5 and ≤1.2 g/10 min, or ≥0.5 and ≤1.0 g/10 min.

The ethylene-based polymer may for example have a melt mass-flow rate as determined in accordance with ASTM D1238 (2013) at a temperature of 190° C. under a load of 5.0 kg, (MFR5) of ≥0.5 and ≤3.0 g/10 min, or ≥0.5 and ≤2.5 g/10 min, or ≥1.0 and ≤2.5 g/10 min, or ≥1.5 and ≤2.5 g/10 min.

The ethylene-based polymer may for example have a melt mass-flow rate as determined in accordance with ASTM D1238 (2013) at a temperature of 190° C. under a load of 21.6 kg, (MFR21) of ≥5.0 and ≤25.0 g/10 min, or ≥5.0 and ≤20.0 g/10 min, or ≥10.0 and ≤20.0 g/10 min, or ≥10.0 and ≤15.0 g/10 min.

The ethylene-based polymer may for example be produced in a gas-phase polymerisation process. It is preferred that the ethylene-based polymer is produced using a fluidised bed reactor. Preferably, the ethylene-based polymer is produced in a gas-phase polymerisation process using a fluidised bed reactor.

The ethylene-based polymer may for example be produced by polymerisation of a reaction mixture comprising ethylene. The present invention also relates to a process for the production of the ethylene-based polymer. In particular, the ethylene-based polymer may be produced by polymerisation of a reaction mixture comprising ethylene and 1-hexene. It is preferred that the ethylene-based polymer is produced by polymerisation in the presence of a single-site catalyst. The single-site catalyst may be a supported catalyst or an unsupported catalyst. It is preferred that the single-site catalyst is a supported catalyst.

It is preferred that the reaction mixture comprises ≥1.00 and ≤3.00 mol %, more preferably ≥1.00 and ≤2.00 mol %, even more preferably ≥1.25 and ≤2.00 mol %, of 1-hexene with regard to the total composition of the reaction mixture.

The single-site catalyst preferably comprises a metallocene complex. Preferably, the single-site catalyst comprises a metallocene complex according to formula I:

formula I

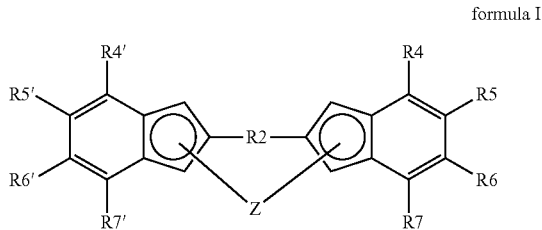

wherein:
R2 is a bridging moiety containing at least one sp2 hybridised carbon atom;
each R4, R4', R7 and R7' are hydrogen or moieties comprising 1-10 carbon atoms, wherein each R4, R4', R7 and R7' are the same;
each R5, R5', R6 and R6' are hydrogen or moieties comprising 1-10 carbon atoms, wherein each R5, R5', R6 and R6' are the same; and
Z is a moiety selected from $ZrX_2$, $HfX_2$, or $TiX_2$, wherein X is selected from the group of halogens, alkyls, aryls and aralkyls.

In particular, Z may be a moiety selected from $ZrX_2$ or $TiX_2$, wherein X is selected from the group of halogens, alkyls, aryls and aralkyls.

Preferably X is a monovalent anionic group, selected from the group consisting of halogen (F, Cl, Br or I), a C1-C20 hydrocarbyl group or a C1-C20 alkoxy group. Preferably X is a methyl group, Cl, Br or I, most preferably methyl or Cl. For example, Z may be a moiety selected from $ZrCl_2$, $HfCl_2$ or $TiCl_2$.

The bridging moiety R2 preferably is a substituted or unsubstituted methylene, 1,2-phenylene or 2,2'-biphenylene moiety. For example, R2 may be a substituted or unsubstituted 2,2'-biphenylene moiety.

For example, the metallocene complex may be a zirconium-containing compound selected from [2,2'-bis(2-indenyl)biphenyl]zirconium dichloride, [2,2'-bis(1-indenyl)biphenyl]zirconium dichloride, [(2-(2-indenyl)-2'-cyclopentadienyl)biphenyl]zirconium dichloride, [(2-(1-indenyl)-2'-cyclopentadienyl)biphenyl]zirconium dichloride, [1,4-bis(2-indenyl)phenyl]zirconium dichloride, [1,4-bis(1-indenyl)phenyl]zirconium dichloride, [(1-(1-indenyl)-4-cyclopentadienyl)phenyl]zirconium dichloride, [(1-(2-indenyl)-4-cyclopentadienyl)phenyl]zirconium dichloride, [(1-(1-indenyl)-1-cyclopentadienyl-1-methyl)ethyl]zirconium dichloride, [(1-(2-indenyl)-1-cyclopentadienyl-1-methyl)ethyl]zirconium dichloride, [(1,1'-bis(1-indenyl)-1-methyl)-ethyl]zirconium dichloride, [(1,1'-bis(2-indenyl)-1-methyl)-ethyl]zirconium dichloride, [(1-(1-indenyl)-1-cyclopentadienyl)methyl]zirconium dichloride, [(1-(2-indenyl)-1-cyclopentadienyl)methyl]zirconium dichloride, [1,1'-bis(2-indenyl)methyl]zirconium dichloride, and [1,1'-bis(1-indenyl)methyl]zirconium dichloride.

For example, the metallocene complex may be a hafnium-containing compound selected from [2,2'-bis(2-indenyl)biphenyl]hafnium dichloride, [2,2'-bis(1-indenyl)biphenyl]hafnium dichloride, [(2-(2-indenyl)-2'-cyclopentadienyl)biphenyl]hafnium dichloride, [(2-(1-indenyl)-2'-cyclopentadienyl)biphenyl]hafnium dichloride, [1,4-bis(2-indenyl)phenyl]hafnium dichloride, [1,4-bis(1-indenyl)phenyl]hafnium dichloride, [(1-(1-indenyl)-4-cyclopentadienyl)phenyl]hafnium dichloride, [(1-(2-indenyl)-4-cyclopentadienyl)phenyl]hafnium dichloride, [(1-(1-indenyl)-1-cyclopentadienyl-1-methyl)ethyl]hafnium dichloride, [(1-(2-indenyl)-1-cyclopentadienyl-1-methyl)ethyl]hafnium dichloride, [(1,1'-bis(1-indenyl)-1-methyl)-ethyl]hafnium dichloride, [(1,1'-bis(2-indenyl)-1-methyl)-ethyl]hafnium dichloride, [(1-(1-indenyl)-1-cyclopentadienyl)methyl]hafnium dichloride, [(1-(2-indenyl)-1-cyclopentadienyl)methyl]hafnium dichloride, [1,1'-bis(2-indenyl)methyl]hafnium dichloride, and [1,1'-bis(1-indenyl)methyl]hafnium dichloride.

For example, the metallocene complex may be a titanium-containing compound selected from [2,2'-bis(2-indenyl)biphenyl]titanium dichloride, [2,2'-bis(1-indenyl)biphenyl]titanium dichloride, [(2-(2-indenyl)-2'-cyclopentadienyl)

biphenyl]titanium dichloride, [(2-(1-indenyl)-2'-cyclopentadienyl)biphenyl]titanium dichloride, [1,4-bis(2-indenyl)phenyl]titanium dichloride, [1,4-bis(1-indenyl)phenyl]titanium dichloride, [(1-(1-indenyl)-4-cyclopentadienyl)phenyl]titanium dichloride, [(1-(2-indenyl)-4-cyclopentadienyl)phenyl]titanium dichloride, [(1-(1-indenyl)-1-cyclopentadienyl-1-methyl)ethyl]titanium dichloride, [(1-(2-indenyl)-1-cyclopentadienyl-1-methyl)ethyl]titanium dichloride, [(1,1'-bis(1-indenyl)-1-methyl)ethyl]titanium dichloride, [(1,1'-bis(2-indenyl)-1-methyl)ethyl]titanium dichloride, [(1-(1-indenyl)-1-cyclopentadienyl)methyl]titanium dichloride, [(1-(2-indenyl)-1-cyclopentadienyl)methyl]titanium dichloride, [1,1'-bis(2-indenyl)methyl]titanium dichloride, and [1,1'-bis(1-indenyl)methyl]titanium dichloride.

For example, the metallocene complex may be selected from [2,2'-bis(2-indenyl)biphenyl]hafnium dichloride, [2,2'-bis(2-indenyl)biphenyl]zirconium dichloride, [2,2'-bis(2-indenyl)biphenyl]titanium dichloride, [2,2'-bis(1-indenyl)biphenyl]hafnium dichloride, [2,2'-bis(1-indenyl)biphenyl]zirconium dichloride, and [2,2'-bis(12-indenyl)biphenyl]titanium dichloride. Preferably, the metallocene complex is [2,2'-bis(2-indenyl)biphenyl]zirconium dichloride.

In the single-site catalyst, the metallocene complex with a cocatalyst may be supported on an inert carrier, also referred to as support. The support may be organic or inorganic. Preferably the support is porous. Exemplary organic support material are crosslinked or functionalised polystyrenes, polyvinylchloride, and crosslinked polyethylenes. Exemplary inorganic support materials are silica, alumina, silica-alumina, inorganic chlorides such as $MgCl_2$, talc and zeolite. The preferred particle size of the support is from 10 to 120 µm. preferably, the support is silica. The pore volume of the support preferably is ≥0.5 and ≤3.0 $cm^3/g$. preferably, the surface area of the support material is ≥50 and ≤500 $m^2/g$. the silica that may be employed as support in for the catalyst system preferably is dehydrated prior to use in preparation of the catalyst system.

It is preferred that the single-site catalyst comprises a metallocene complex supported on a porous silica support having a particle size of from 10 to 120 µm, a pore volume of ≥0.5 and ≤3.0 $cm^3/g$, and a surface area of ≥50 and ≤500 $m^2/g$, as determined in accordance with ISO 9276-2 (2014).

The cocatalyst is preferably an organoaluminium compound or a non-coordinating anionic compound. Examples of suitable cocatalysts are methylaluminoxane, also referred to as MAO, modified methylaluminoxane, borane or borate compounds such as perfluorphenylborane, triethylammonium tetrakis(pentafluorphenyl)borate, triphenylcarbenium tetrakis(pentafluorphenyl)borate, trimethylsilyl tetrakis(pentafluorphenyl)borate, and boratabenzenes such as 1-pentafluorphenyl-1,4-dihydroboratabenzene, tributylammonium-1,4-bis(pentafluorphenyl)boratabenzene, triphenylcarbenium-1-methylboratabenzene. Preferably, the cocatalyst is methylaluminoxane.

Preferably a continuity aid agent may be used. The continuity aid agent preferably is a product obtained by reaction of a compound of the formula Al(R1)(R2)(R3) with a compound of the formula N(R4)(R5)(R6). Herein:

R1 is hydrogen or a hydrocarbon group having 1-30 carbon atoms;

R2 and R3 are the same or different and each a hydrocarbon group having 1-30 carbon atoms;

R4 is hydrogen, a functional group with at least one active hydrogen, or a moiety having 1-30 carbon atoms;

R5 is hydrogen or a moiety having 1-30 carbon atoms; and

R6 is a moiety having 1-30 carbon atoms.

Preferably:

R1 is hydrogen or a hydrocarbon group having 1-30 carbon atoms;

R2 and R3 are the same or different and each a hydrocarbon group having 1-30 carbon atoms;

R4 is hydrogen or a moiety having 1-30 carbon atoms;

R5 is hydrogen or a moiety having 1-30 carbon atoms; and

R6 is a moiety having 1-30 carbon atoms.

More preferably:

Each R1, R2 and R3 are the same each are a hydrocarbon group having 1-30 carbon atoms;

R4 is hydrogen or a moiety having 1-30 carbon atoms;

R5 is a moiety having 1-30 carbon atoms; and

R6 is a moiety having 1-30 carbon atoms.

The compound of the formula Al(R1)(R2)(R3) may for example be selected from a trialkyl aluminium or a dialkylaluminiumhydride, wherein the alkyl moieties are moieties having 1 to 10 carbon atoms. For example, the compound of the formula Al(R1)(R2)(R3) may be selected from trimethyl aluminium, triethyl aluminium, tri-n-propyl aluminium, tri-isopropyl aluminium, tri-n-butyl aluminium, tri-isobutyl aluminium, dimethyl aluminiumhydride, diethyl aluminiumhydride, di-isopropyl aluminiumhydride, di-n-propyl aluminiumhydride, di-isobutyl aluminiumhydride, and di-n-butyl aluminiumhydride. Preferably, the compound of the formula Al(R1)(R2)(R3) is tri-isobutyl aluminium. The compound of the formula Al(R1)(R2)(R3) may also be referred to as the cocatalyst aid.

The compound of the formula N(R4)(R5)(R6) may for example be cyclohexylamine. Alternatively, the compound of the formula N(R4)(R5)(R6) may for example be a compound selected from tris(trimethylsilyl)amine, tris(triethylsilyl)amine, tris(triisopropylsilyl)amine, tris(triisobutylsilylamine), N,N-bis(trimethylsilyl)methylamine, N,N-bis(trimethylsilyl)dodecylamine, and N,N-bis(trimethylsilyl)octadecylamine. The compound of the formula N(R4)(R5)(R6) may also be referred to as the antistatic agent.

For example, the cocatalyst aid may be tri-isobutyl aluminium and the antistatic agent may be cyclohexylamine. Alternatively, the cocatalyst aid may be tri-isobutyl aluminium and the antistatic agent may be tris(trimethylsilyl)amine or N,N-diisopropylethylamine.

The amount of antistatic agent to be provided to the polymerisation reaction may for example be ≥1 and ≤1000 ppm by weight with regard to the weight of the polyethylene polymer that is produced, preferably ≥1 and ≤100 ppm, more preferably ≥1 and ≤20 ppm.

The continuity aid agent may be used in the polymerisation process in an amount of between 0.01 and 0.1 mmol per gram of catalyst.

In a particular embodiment of the invention, the pipe is compliant with the PE-RT requirements of ISO 22391-1 (2009). For example, the pipe may have the value 'pass' for PERT-I when tested according to the requirements of ISO 22391-1 (2009). Particularly, the pipe may be a potable cold water pipe, a potable hot water pipe, a pipe for an underfloor heating system, of a pipe for a solar heat collection system.

In a certain embodiment, the invention also relates to the use of the pipe according to the invention for improvement of the raised temperature resistance of a pipe in accordance with ISO 22391-1 (2009).

In a certain further embodiment, the invention also relates to the use of an ethylene-based polymer according to the invention or of an ethylene-based polymer produced according to the process of the invention for improvement of the strain hardening modulus of a pipe in accordance with ISO 18488 (2015).

The invention will now be illustrated by the following non-limiting examples.

Materials

| Metallocene | [2,2'-bis(2-indenyl)biphenyl]zirconium dichloride, CAS reg. nr. 312968-31-3, obtainable from Innovasynth Technologies |
|---|---|
| Support | Silica 955, obtainable from W.R. Grace & Co |
| Cocatalyst | Methyl aluminoxane (MAO), CAS reg. nr. 29429-58-1, obtainable from W.R. Grace & Co |
| Cocatalyst aid | Triisobutyl aluminium (TIBAL), CAS reg. nr. 100-99-2, obtainable from Sigma-Aldrich |
| Antistatic agent | Cyclohexyl amine, CAS reg. nr. 108-91-8 |
| Continuity aid agent | Composition comprising 2 wt % of a blend of the cocatalyst aid and the antistatic agent (at molar ratio 2.85:1) diluted in iso-pentane |

Catalyst Production

The support was pre-dehydrated at 600° C. for 4 hours. 3 g of the pre-dehydrated support was charged into a 100 ml two-neck Schlenk flask in a glovebox under nitrogen atmosphere, followed by addition of 15 ml of toluene. After shaking, a suspension was obtained. 0.052 g of the metallocene was activated by mixing it with 6.3 ml of a 10 wt % solution of the cocatalyst in toluene in a 25 ml vial at room temperature for 10 min in the glovebox, also under nitrogen atmosphere. The activated metallocene was transferred into the suspension. The mixture was heated to 70° C. and maintained at that temperature for 1 hour. Subsequently, the product was dried at 70° C. under vacuum to obtain the supported catalyst, which was isolated as free-flowing powder. The supported catalyst contained 0.24 wt % of Zr and 7.2 wt % of Al, which translates to a molar ratio of Al to Zr of ca. 100.

Polymerisation

In a continuously operated gas-phase fluidised bed reactor having an internal diameter of 45 cm and a reaction zone height of 140 cm, a polymerisation reaction was performed wherein a fluidised bed was maintained by recirculation of a recycle gas stream. The reactor was kept at a constant temperature of 80° C. and at a constant pressure of 21.7 bar. Ethylene and hexene were used in a feed stream comprising the recycled gas, fresh ethylene, 1-hexene and nitrogen, so that the gas stream that was fed to the reactor comprised 53.0 mol % ethylene and 0.95 mol % 1-hexene in example A, and 1.55 mol % 1-hexene in example B.

A quantity of the supported catalyst as produced above was continuously injected into the reactor so that the quantity of zirconium in the reactant mixture was 0.18 wt %. A quantity of 0.08 hg/h of the continuity aid agent was introduced continuously. The produced polymer was discharged from the reactor and purged to remove volatile matter, and treated with humidified nitrogen to deactivate traces of catalyst.

The thus obtained polymer was subjected to analyses to determine the material properties, which are presented in table 1 below.

| Example | A | B |
|---|---|---|
| MFR2 | 0.7 | 0.8 |
| MFR5 | 1.65 | 1.98 |
| MFR21 | 12.54 | 12.41 |
| Density | 939 | 932 |
| Strain hardening | 34 | 49 |
| Charpy at 23° C. | 75 | 103 |
| Charpy at −30° C. | 20.8 | 20.8 |
| C6 | 4-5 | 3-6 |
| C6 ratio | 1.15 | 1.65 |
| $M_w/M_n$ | 3.47 | 3.27 |
| $M_w$ | 143737 | 127000 |
| $M_n$ | 41358 | 38800 |
| $M_z$ | 289080 | 297000 |

Wherein:

MFR2, MFR5 and MFR21 are the melt mass-flow rate as determined in accordance with ASTM D1238 (2013) at a temperature of 190° C. under a load of 2.16 kg, 5.0 kg and 21.6 kg, respectively, expressed in g/10 min.

Density is determined in accordance with ASTM D792 (2008), expressed in kg/m$^3$.

Strain hardening is the strain hardening modulus $G_p$ determined in accordance with ISO 18488 (2015), expressed in MPa.

Charpy is the notched Charpy impact strength as determined in accordance with ISO 179-1 (2010), notch type A, edgewise, expressed in kJ/m$^2$.

C6 is the comonomer branch content in the molecular weight range of log($M_w$) between 4.0 and 5.5 expressed as the number of comonomer-derived branches per 1000 carbon atoms in the polymer, as determined via $^{13}$C NMR.

C6 ratio is the ratio of the number of comonomer-derived branches per 1000 carbon atoms in the polymer at log($M_w$)=5.5 divided by the number of comonomer-derived branches per 1000 carbon atoms in the polymer at log($M_w$)=4.0, as determined via $^{13}$C NMR:

$$C6 \text{ ratio} = \frac{\log(Mw), 5.5}{\log(Mw), 4.0}$$

$M_w/M_n$ is the molecular weight distribution as determined in accordance with ASTM D6474 (2012), dimensionless.

$M_w$ is the weight average molecular weight as determined in accordance with ASTM D6474 (2012), in g/mol.

$M_n$ is the number average molecular weight as determined in accordance with ASTM D6474 (2012), in g/mol.

$M_z$ is the z-average molecular weight as determined in accordance with ASTM D6474 (2012), in g/mol.

From the above, it can be observed that the polymer of example B demonstrated an improved strain hardening and Charpy impact strength at 23° C.

The invention claimed is:

1. Pipe comprising an ethylene-based polymer, wherein the ethylene-based polymer:

comprises ≥1.20 mol % and ≤2.00 mol %, of units derived from 1-hexene, with regard to the total molar quantity of polymeric units of the ethylene-based polymer;

has a molecular weight distribution $M_w/M_n$ as determined in accordance with ASTM D6474 (2012) of ≥2.5 and ≤3.4;

has a density as determined in accordance with ASTM D792 (2008) of ≥930 and ≤935 kg/m$^3$; and in the molecular weight range of log($M_w$) between 4.0 and 5.5 has a comonomer branch content of between 2 and 15 comonomer-derived branches per 1000 carbon atoms in the polymer, as determined via $^{13}$C NMR.

2. Pipe according to claim 1, wherein the ethylene-based polymer has a comonomer incorporation ratio of ≥1.50, wherein the comonomer incorporation ratio is defined as the ratio between the quantity of comonomer-derived branches per 1000 carbon atoms in the polymer at log($M_w$)=5.5 and the quantity of comonomer-derived branches per 1000 carbon atoms in the polymer at log ($M_w$)=4.0, as determined via $^{13}$C NMR.

3. Pipe according to claim 1, wherein the ethylene-based polymer comprises ≥95.0 mol % of units derived from ethylene, with regard to the total molar quantity of polymeric units of the ethylene-based polymer.

4. Pipe according to claim 1, wherein the ethylene-based polymer has a melt mass-flow rate of ≥0.1 and ≤5.0 g/10 min, as determined in accordance with ASTM D1238 (2013) at a temperature of 190° C. under a load of 2.16 kg.

5. Pipe according to claim 1, wherein the ethylene-based polymer has a melt mass-flow rate of ≥0.5 and ≤3.0 g/10 min, as determined in accordance with ASTM D1238 (2013) at a temperature of 190° C. under a load of 5.0 kg.

6. Pipe according to claim 1, wherein the ethylene-based polymer has a melt mass-flow rate of ≥5.0 and ≤25.0 g/10 min, as determined in accordance with ASTM D1238 (2013) at a temperature of 190° C. under a load of 21.6 kg.

7. Pipe according to claim 1, wherein the pipe is a potable cold water pipe, a potable hot water pipe, a pipe for an underfloor heating system, or a pipe for a solar heat collection system.

8. Pipe according to claim 1, wherein the pipe has the value 'Pass' for PERT-I when tested according to the requirements of ISO 22391-1 (2009).

9. Pipe according to claim 1 wherein the ethylene-based polymer is produced in a gas-phase polymerisation process operated in a fluidised bed reactor.

10. Pipe according to claim 1, wherein the ethylene-based polymer is produced in the presence of a supported single-site catalyst comprising a metallocene complex.

11. Pipe comprising an ethylene-based polymer, wherein the ethylene-based polymer:
  comprises ≥1.25 mol % and ≤2.00 mol %, of units derived from 1-hexene, with regard to the total molar quantity of polymeric units of the ethylene-based polymer;
  has a molecular weight distribution $M_w/M_n$ as determined in accordance with ASTM D6474 (2012) of ≥3.0 and ≤3.4;
  has a density as determined in accordance with ASTM D792 (2008) of ≥930 and ≤935 kg/m$^3$; and
  in the molecular weight range of log($M_w$) between 4.0 and 5.5 has a comonomer branch content of between 3 and 9 comonomer-derived branches per 1000 carbon atoms in the polymer, as determined via $^{13}$C NMR;
  a comonomer incorporation ratio of ≥1.50 and ≤2.50, wherein the comonomer incorporation ratio is defined as the ratio between the quantity of comonomer-derived branches per 1000 carbon atoms in the polymer at log($M_w$)=5.5 and the quantity of comonomer-derived branches per 1000 carbon atoms in the polymer at log ($M_w$)=4.0, as determined via $^{13}$C NMR and
  a melt mass-flow rate of ≥0.5 and ≤1.0 g/10 min, as determined in accordance with ASTM D1238 (2013) at a temperature of 190° C. under a load of 2.16 kg.

12. Pipe according to claim 11, wherein the pipe has the value 'Pass' for PERT-I when tested according to the requirements of ISO 22391-1 (2009).

* * * * *